D. J. BOUCHER.
CUTTING TOOL.
APPLICATION FILED JUNE 10, 1919.
1,323,736.
Patented Dec. 2, 1919.
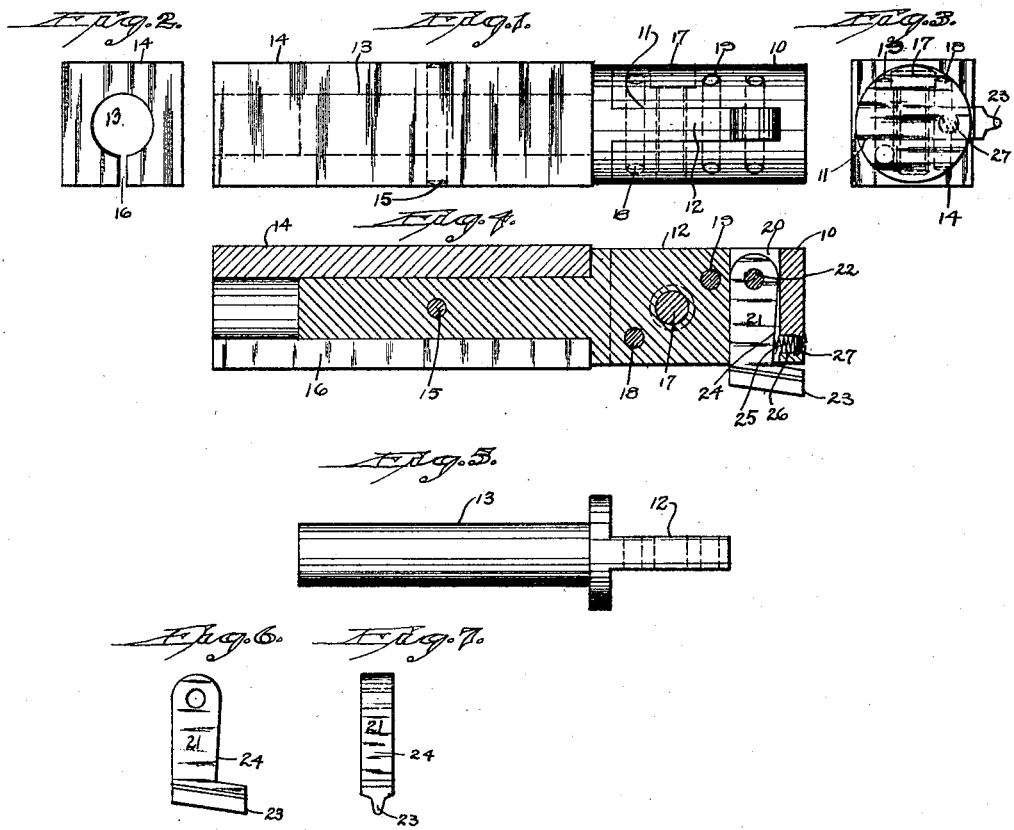

UNITED STATES PATENT OFFICE.

DONAT J. BOUCHER, OF NEW HAVEN, CONNECTICUT.

CUTTING-TOOL.

1,323,736.   Specification of Letters Patent.   Patented Dec. 2, 1919.

Application filed June 10, 1919. Serial No. 303,094.

*To all whom it may concern:*

Be it known that I, DONAT J. BOUCHER, a subject of the King of Great Britain, residing at New Haven, in the county of New Haven and State of Connecticut, have invented a new and useful Improvement in Cutting-Tools; and I do hereby declare the following, when taken in connection with the accompanying drawings and the characters of reference marked thereon, to be a full, clear, and exact description of the same, and which said drawings constitute part of this application, and represent, in—

Figure 1 a plan view of a cutting tool constructed in accordance with my invention.

Fig. 2 an inner end view of the same.

Fig. 3 an outer end view thereof.

Fig. 4 a longitudinal sectional view.

Fig. 5 a plan view of the holding stem detached.

Fig. 6 a plan view of the cutter, detached.

Fig. 7 an edge view of the same.

This invention relates to an improvement in cutting tools particularly adapted for use in cutting gears or grooves also adapted for use in slotters and planers, the object being to so arrange the cutter that it will slightly yield on the back stroke so as to freely withdraw, and the invention consists in the construction hereinafter described and particularly recited in the claims.

In carrying out my invention I employ a head 10 which as herein shown is preferably round, and formed with a longitudinal groove 11 entering from the inner end. Entering and closely fitting this groove 11 is a flat stem 12 of a round shank 13 which is fitted in a holding block 14 in which it may be secured by a pin 15, this block being formed in one side with a longitudinal slot 16 to permit of its being crowded onto the shank 13 when placed in the usual tool-holder. The stem 12 is connected with a head 10 by a transversely arranged screw 17 and the connection between the stem and the head is further reinforced by dowel pins 18 and 19. The outer end of the stem 12 is shorter than the slot 11 so as to form a transverse recess 20 for a cutter 21 which is mounted on a pivot pin 22, this cutter projecting beyond the head where it is provided with a cutting edge 23 of the character desired for the special work for which the tool is used. The forward edge 24 of the cutter is slightly tapered as clearly shown in Fig. 4 of the drawings, and the cutting edge 23 is tapered and clears the side of the head 10. This cutter is held against the outer end of the stem 12 by means of a spring 25 arranged in a hole 26 formed for it in the outer end of the head 10 which hole is closed by a screw plug 27. In the forward movement of the tool the cutting edge 23 comes in contact with the work and the cutter is backed up against the stem 12 which forms a solid backing for it. On the reverse movement, however, the cutter drags upon the work and moves forward against the spring 25 so as to relieve the pressure of the cutter against the work, allowing it to be easily withdrawn and then sprung outward ready for the next cut, this arrangement being particularly advantageous in use in cutting gears and in grooving.

I claim:—

1. A cutting tool comprising a head formed with a slot entering the inner end, a stem entering the slot than which it is shorter, said head firmly secured to said stem, a cutter entering between the outer end of the stem and the outer wall of the slot in the head, said cutter projecting outward at one side beyond the said head and formed with a cutting edge.

2. A cutting tool comprising a round head formed with a transverse slot, a stem entering said slot than which it is shorter, said stem formed with a shank, said head connected with said stem by a bolt and dowel pins, a cutter pivoted in a space formed between the outer end of the stem and the inner wall of the slot in the head, said cutter projecting outward beyond the said head and formed with a beveled edge, a spring mounted in the outer end of the head and bearing against said cutter tending to force the same to a bearing against the outer end of the stem.

In testimony whereof, I have signed this specification in the presence of two subscribing witnesses.

DONAT J. BOUCHER.

Witnesses:
 JOHN W. BOUCHER,
 CHARLES L. BOUCHER.